Figure 1:
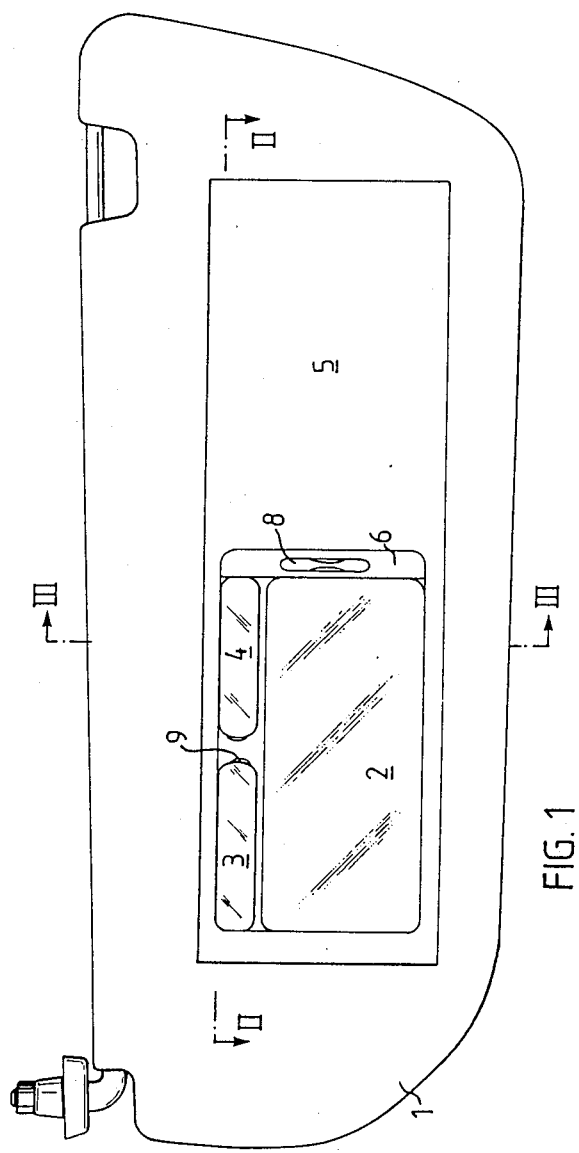

United States Patent [19]

Jönsås

[11] Patent Number: 4,809,140
[45] Date of Patent: Feb. 28, 1989

[54] VEHICLE SUN VISOR WITH ILLUMINATED MIRROR AND SLIDING PANEL

[75] Inventor: Mats Jönsås, Mora, Sweden

[73] Assignee: Autopart Sweden AB, Malung, Sweden

[21] Appl. No.: 113,920

[22] Filed: Oct. 29, 1987

[30] Foreign Application Priority Data

Oct. 29, 1986 [SE] Sweden ................................. 8604606

[51] Int. Cl.$^4$ ............................................. F21V 23/00
[52] U.S. Cl. ...................................... 362/74; 362/135; 362/140; 362/142; 796/97.5
[58] Field of Search ................. 362/135, 142, 144, 61, 362/74, 140, 141; 296/97 H; 224/312; 350/606

[56] References Cited

U.S. PATENT DOCUMENTS

| 4,004,404 | 12/1976 | Marcus | 362/135 |
| 4,075,468 | 2/1978 | Marcus | 362/144 |
| 4,648,011 | 3/1987 | Boote et al. | 362/135 |
| 4,683,522 | 7/1987 | Viertel et al. | 362/135 |
| 4,710,856 | 12/1987 | Cheung | 362/135 X |
| 4,734,831 | 3/1988 | Keyser et al. | 362/142 X |

FOREIGN PATENT DOCUMENTS 0099454  2/1984  European Pat. Off. .

Primary Examiner—Ira S. Lazarus
Assistant Examiner—Richard R. Cole
Attorney, Agent, or Firm—Young & Thompson

[57] ABSTRACT

The present invention relates to a vehicle sun visor comprising an illuminated mirror (2) and a sliding panel (6) to cover the mirror when the mirror is not in use. According to the invention the dimensions of the sliding panel are such that the lighting units (3,4) are covered by the panel when in its position covering the mirror (2).

3 Claims, 2 Drawing Sheets

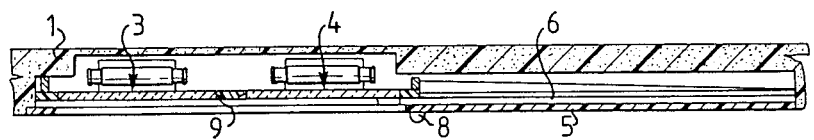
FIG. 2
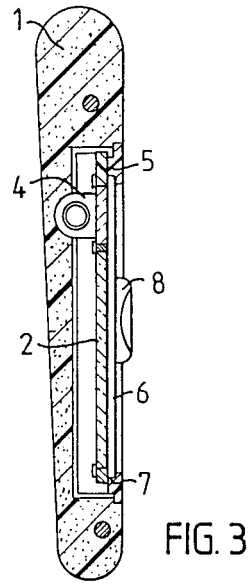
FIG. 3
FIG. 4
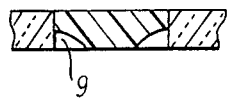

VEHICLE SUN VISOR WITH ILLUMINATED MIRROR AND SLIDING PANEL

The present invention relates to a vehicle sun visor comprising an illuminated mirror and a sliding panel to cover the mirror when the mirror is not in use.

In known sun visors of the above mentioned type, the sliding panel is not of sufficient dimensions to cover the diffuser plates of the lighting means, which are therefore left uncovered by the panel even when neither the mirror nor the lighting is being used. If the lighting means are unintentionally turned on, it may dazzle the occupants of the vehicle.

The purpose of the invention is to remove these disadvantages and achieve an easily installed and functional design.

This purpose is achieved with a sun visor as hereinafter described. Not only does the particular construction of the panel remove the disadvantages mentioned, but the diffuser plates are held securely when the panel is in its closed position and a more esthetically attractive design is provided.

These and other features and advantages will become more evident from the following detailed description of a preferred embodiment of a sun visor according to the invention with reference to the accompanying drawings, of which:

FIG. 1 is a front view of a folded-down sun visor according to one embodiment of the invention, FIG. 2 shows a cross section along the line II—II in FIG. 1, FIG. 3 shows a cross section along the line III—III in FIG. 1, and FIG. 4 is an enlarged fragment of FIG. 3.

The sun visor 1 comprises, on its side facing the passenger when the sun visor is folded down, a mirror 2 and lighting means 3,4 consisting of diffuser plates with integrated lamp holders and lamps. The lighting means also has a power supply unit, comprising wiring, contact terminals and a switch. In the embodiment shown, the mirror with lighting means, including the power supply unit, is mounted in a special mirror cassette which is fixed by a suitable method, preferably by adhesive, in a cavity in the body of the sun visor. Other embodiments are of course conceivable; for example, the mirror can be a self-supporting unit carrying the lighting means, or a separate cassette for the power supply unit could also be used.

A frame 5 supporting a sliding panel 6 is placed outside the mirror cassette in the cavity in the sun visor body. In the drawings, the panel 6 with handle 8 is shown in its open position, in which the panel is mostly covered by a covered portion of the frame 5, thus exposing the mirror and the illumination unit. As can best be seen in FIG. 3, the panel slides in lateral grooves 7 in the frame. The Figures also show that the frame extends over edge portions of the mirror cassette. In this context it should be noted that no parts of the units 3,4 may be covered by the frame, since these units should be easily removable for simple lamp replacement. For this purpose, the portions of the mirror cassette into which the units 3,4 are pressed or snapped, are provided with depressions 9 into which a finger nail or the like can be inserted to remove either unit, as seen in FIG. 4.

As shown in the drawings, the panel 6 is wide enough so that when assuming its closed position, i.e. when the panel has been largely pulled out of the covered portion of the frame into abutment against the left-hand portion (as shown in FIG. 1) of the open portion of the frame, it covers both the mirror 2 and the units 3 and 4. In addition to removing the above mentioned disadvantages, this design feature makes it possible to reduce the required snap-in force for the units 3,4 by virtue of the fact that during most of the time when the vehicle is being used, they are held securely behind the closed panel. And this snap-in force need not be so great as to securely hold the diffuser plates when subjected to the maximum loads occurring during normal use of the vehicle, since the mirror will not be in use in such maximum load situations.

Preferably, the switch of the power supply unit is coupled to the movement of the panel so that moving the panel from the closed position to the open position shown in FIG. 1 automatically lights the lamps.

In a variant, which is not shown here, the mirror can be made as a self-supporting plate having edges made as guides for the panel and cavities for receiving the lighting means.

In another variant, not shown, the sun visor body can be made so that the portion receiving the major part of the panel in its open position consists of an outwardly closed cavity instead of the open cavity in the embodiment in the drawing, which is covered by the covered portion of the frame 5. This has the advantage that the frame does not require a covered portion and that it does not need to extend farther into such a cavity than what is required to provide firm guidance of the sliding panel.

In the embodiment shown, the panel is suitably held in its set position by friction between the edges of the panel and the grooves in the frame. It is of course also possible to arrange cooperating projections and depressions in the panel and grooves to define two functional positions of the panel.

A number of modifications of the sun visor described here are conceivable within the scope of the invention which is only limited by the attached claims.

I claim:

1. Vehicle sun visor, comprising an illuminated mirror (2), a sliding panel (6) to cover the mirror when the mirror is not in use, and lighting means beside the mirror, the sliding panel having dimensions such that the lighting means (3, 4) are covered by the panel when the panel covers the mirror, the sliding panel (6) being linearly displaceable in guide grooves (7) in a frame (5) comprising a covered portion which substantially covers the panel in its open position exposing the mirror (2), the frame being disposed in a recess in the visor but being completely exposed on the side of the visor from which the mirror is visible.

2. Sun visor according to claim 1, in which the lighting means are arranged above the mirror (2) and the mirror and lighting means have a total height and the sliding panel (6) has a vertical dimension which, when the visor is folded down, is greater than the total height of the mirror and lighting means (3, 4).

3. Sun visor according to claim 1, in which the lighting means (3, 4) consisting of diffuser plates, lampholders and lamps, are completely exposed in a fully open position of the panel (6) so as to be easily removable without obstruction by the panel or frame.

* * * * *